(12) United States Patent
Kretz et al.

(10) Patent No.: US 8,234,272 B2
(45) Date of Patent: Jul. 31, 2012

(54) SEARCHING AND RANKING CONTACTS IN CONTACT DATABASE

(75) Inventors: Martin Kretz, Lund (SE); Rudolf George Tom Gajdos, Dalby (SE)

(73) Assignee: Sony Mobile Communications AB, Lund (SE)

( * ) Notice: Subject to any disclaimer, the term of this patent is extended or adjusted under 35 U.S.C. 154(b) by 876 days.

(21) Appl. No.: 11/840,398

(22) Filed: Aug. 17, 2007

(65) Prior Publication Data

US 2008/0275865 A1 Nov. 6, 2008

Related U.S. Application Data

(60) Provisional application No. 60/916,068, filed on May 4, 2007.

(51) Int. Cl.
*G06F 17/30* (2006.01)
(52) U.S. Cl. ........................................ 707/723; 707/748
(58) Field of Classification Search .................. 707/723, 707/748
See application file for complete search history.

(56) References Cited

U.S. PATENT DOCUMENTS

| | | | |
|---|---|---|---|
| 6,269,307 B1* | 7/2001 | Shinmura et al. | 701/301 |
| 6,446,068 B1* | 9/2002 | Kortge | 1/1 |
| 6,950,649 B2* | 9/2005 | Videtich | 455/414.1 |
| 7,031,700 B1 | 4/2006 | Weaver et al. | |
| 7,340,260 B2* | 3/2008 | McAlexander | 455/456.1 |
| 7,599,917 B2* | 10/2009 | Meyerzon et al. | 1/1 |
| 7,603,360 B2* | 10/2009 | Ramer et al. | 707/10 |
| 7,617,207 B2* | 11/2009 | Jamison, IV et al. | 1/1 |

(Continued)

FOREIGN PATENT DOCUMENTS

EP 1 691 565 A1 8/2006

(Continued)

OTHER PUBLICATIONS

International Search Report and Written Opinion dated Apr. 10, 2008 issued in corresponding PCT application No. PCT/IB2007/054457, 14 pages.

*Primary Examiner* — Sherief Badawi
*Assistant Examiner* — Noosha Arjomandi
(74) *Attorney, Agent, or Firm* — Snyder, Clark, Leach & Chung, LLP

(57) ABSTRACT

In one aspect, a method may include receiving a request from a first mobile device for a search for contacts meeting a criterion; searching a database of contacts for the contacts meeting the criterion and including the contacts meeting the criterion in search results; determining whether a second mobile device associated with one of the contacts meeting the criterion is within a vicinity of the first mobile device; and ranking the search results based on the determination. In another aspect, the method may further include determining a database distance between a reference contact and each of one or more of the search results, where the request is associated with a reference contact in the database of contacts; and ranking the search results based on the determined database distance; where the database of contacts may include a plurality of subsets of contacts, where contacts in the subsets are linked to another contact in the database of contacts; where determining a database distance between the reference contact and each of the one or more of the search results may include determining the number of links between the reference contact and each of one or more of the search results.

14 Claims, 9 Drawing Sheets

U.S. PATENT DOCUMENTS

| | | | |
|---|---|---|---|
| 7,644,353 B2* | 1/2010 | Johnson, Jr. | 715/234 |
| 2002/0049751 A1* | 4/2002 | Chen et al. | 707/3 |
| 2004/0130574 A1* | 7/2004 | Kautto-Koivula et al. | 345/764 |
| 2004/0203381 A1* | 10/2004 | Cahn et al. | 455/41.2 |
| 2005/0033752 A1* | 2/2005 | Prager et al. | 707/100 |
| 2005/0065980 A1 | 3/2005 | Hyatt et al. | |
| 2005/0262050 A1* | 11/2005 | Fagin et al. | 707/3 |
| 2006/0015539 A1* | 1/2006 | Wolf et al. | 707/201 |
| 2006/0031340 A1* | 2/2006 | Mathew et al. | 709/206 |
| 2006/0047825 A1 | 3/2006 | Steenstra et al. | |
| 2006/0123014 A1* | 6/2006 | Ng | 707/100 |
| 2007/0118520 A1* | 5/2007 | Bliss et al. | 707/5 |
| 2007/0150444 A1* | 6/2007 | Chesnais et al. | 707/3 |
| 2007/0174265 A1* | 7/2007 | Gorti et al. | 707/4 |
| 2007/0239724 A1* | 10/2007 | Ramer et al. | 707/10 |
| 2007/0266099 A1* | 11/2007 | Wang et al. | 709/206 |
| 2007/0276799 A1* | 11/2007 | Kalervo et al. | 707/3 |
| 2008/0109434 A1* | 5/2008 | Stephens | 707/7 |
| 2008/0208812 A1* | 8/2008 | Quoc et al. | 707/3 |
| 2008/0227470 A1* | 9/2008 | Tien | 455/456.6 |

FOREIGN PATENT DOCUMENTS

| | | |
|---|---|---|
| GB | 2 331 166 A | 5/1999 |
| WO | WO 01/97544 A1 | 12/2001 |

* cited by examiner

| CONTACT ID 304 | NAME 308 | HOME ADDR. 312 | PHONE NO. 316 | WORK ADDR. 324 | PROF. 336 | INTERESTS 340 | CONTACT LIST 344 |
|---|---|---|---|---|---|---|---|
| 1 | JENNIE HAKANSSON | SODERMALM STOCKHOLM | +46 1234 | SODERMALM STOCKHOLM | ENG. | SKIING | 3, 4 |
| 2 | ERIK JOHANSSON | SODERMALM STOCKHOLM | +46 3456 | SODERMALM STOCKHOLM | POLICE | HIKING | 3, 4 |
| 3 | HELENA NILSSON | SODERMALM STOCKHOLM | +46 4567 | SODERMALM STOCKHOLM | ENG. | SKIING | 1, 2, 4 |
| 4 | BERNTH BLOMQUIST | LUND | +46 5678 | LUND | LAW | HIKING | 5, 6 |
| 5 | ERIK JOHANSSON | SODERMALM STOCKHOLM | +46 7890 | SODERMALM STOCKHOLM | ENG. | HUNTING | 6, 7, 3 |
| 6 | LARS NORDSTROM | LUND | +46 4321 | GOTHENBRG. | ENG. | LINUX, STAR TREK | 7 |
| 7 | ERIK JOHANSSON | NORRMALM STOCKHOLM | +46 5432 | GAMLA STAN STOCKHOLM | ACCT. | SKIING, TRAVELING | 1, 2 |
| 8 | SABINA NYSTROM | VISBY GOTLAND | +46 6543 | VISBY GOTLAND | BAR TENDER | SUNNING, SWIMMING | |

CONTACT DATABASE 262

FIG. 3

PERSONAL
CONTACT
DATABASE
566

| MY-CONTACT ID 602 |
|---|
| 1 |

| CONTACT ID 304 | NAME 308 | HOME ADDR. 312 | PHONE NOS. 316 | WORK ADDR. 324 | PROF. 336 | INTERESTS 340 | CONTACTS 344 |
|---|---|---|---|---|---|---|---|
| 1 | JENNIE HAKANSSON | SODERMALM STOCKHOLM | +46 1234 | SODERMALM STOCKHOLM | ENG. | SKIING | 3, 4 |
| 3 | HELENA NILSSON | SODERMALM STOCKHOLM | +46 4567 | SODERMALM STOCKHOLM | ENG. | SKIING | 1, 2, 4 |
| 4 | BERNTH BLOMQUIST | LUND | +46 5678 | LUND | LAW | HIKING | 5, 6 |

FIG. 6

SEARCHING AND RANKING CONTACTS IN CONTACT DATABASE

RELATED APPLICATION

This application claims priority under 35 U.S.C. §119 based on U.S. Provisional Application No. 60/916,068, filed May 4, 2007, the disclosure of which is hereby incorporated herein by reference.

BACKGROUND

1. Related Field

Embodiments described herein relate generally to searching for and ranking contacts.

2. Description of Related Art

Mobile phones and other devices may have "contact lists" that may provide a user with a list of contact names and corresponding telephone numbers, for example. A user may select one of the contacts and call the contact. Users may have to enter contact names and numbers into their mobile phone, which may be tedious, resulting in scant, outdated, or incorrect contact information.

SUMMARY

In one aspect, a method may include receiving a request from a first mobile device for a search for contacts meeting a criterion; searching a database of contacts for the contacts meeting the criterion and including the contacts meeting the criterion in search results; determining whether a second mobile device associated with one of the contacts meeting the criterion is within a vicinity of the first mobile device; and ranking the search results based on the determination.

Additionally, the database of contacts may be stored in a server separate from the first mobile device and the second mobile device and the method may further include delivering the ranked search results to the first mobile device.

Additionally, the request for the search may include a name of a person.

Additionally, determining whether the second mobile device associated with the one of the contacts meeting the criterion may include the first mobile device transmitting electromagnetic radiation directly to the second mobile device.

Additionally, the vicinity may include ten meters and the first and second devices may include mobile telephones.

Additionally, the method may further include determining a database distance between a reference contact and each of one or more of the search results, where the request may be associated with a reference contact in the database of contacts; and ranking the search results based on the determined database distance; where the database of contacts may include a plurality of subsets of contacts, where contacts in the subsets may be linked to another contact in the database of contacts; where determining a database distance between the reference contact and each of the one or more of the search results may include determining the number of links between the reference contact and each of one or more of the search results.

Additionally, the method may include ranking the search results based on a correlation between the reference contact and each of the one or more of the search results.

Additionally, correlating the reference contact with one or more search results may include comparing a profession, an interest, a calendar event, an updated time, a location, a physical address, a network address, a cell tower identifier, a wireless local area network identifier, a country code, an area code, or an age associated with the reference contact with a profession, an interests, a calendar event, a search time, a location, a physical address, a network address, a cell tower identifier, a wireless local area network identifier, a country code, an area code, or an age, respectively, associated with the one or more search results.

Additionally, correlating the reference contact with one or more search results may include comparing a physical address associated with the reference contact with a physical address associated with the one or more search results.

In another aspect, a method may include receiving a request for a search for contacts meeting a criterion; searching a database of contacts for the contacts meeting the criterion and including the contacts meeting the criterion in search results, where the request is associated with a reference contact in the database of contacts; determining a database distance between the reference contact and each of one or more of the search results; where the database of contacts may include a plurality of subsets of contacts, where contacts of subsets may be linked to another contact in the database of contacts; and where determining the database distance between the reference contact and each of the one or more of the search results may include determining the number of links between the reference contact and each of the one or more of the search results; and ranking the search results based on the determined database distance.

Additionally, the contacts of subsets may be linked to the other contact in the database of contacts by virtue of a placed or received call, a sent or received text message, a sent or received multi-media message, calendar event information, history of a shared file, photograph meta data, or a recognized face in a photograph.

Additionally, the method may include ranking the search results based on a correlation between the reference contact and each of the one or more of the search results.

Additionally, correlating the reference contact with each of the one or more search results may include comparing a profession, an interest, a calendar event, an updated time, a location, a physical address, a network address, a cell tower identifier, a wireless local area network identifier, a country code, an area code, or an age associated with the reference record with a profession, an interest, a calendar event, a search time, a location, a physical address, a network address, a cell tower identifier, a wireless local area network identifier, a country code, an area code, or an age, respectively, associated with the one or more search results.

Additionally, correlating the reference contact with the one or more search results may include comparing a physical address associated with the reference contact with a physical address associated with the one or more search results.

Additionally, the method may further comprise determining whether a second device associated with one of the contacts meeting the criterion may be within a vicinity of a first device associated with the reference contact; and ranking the search results based on the determination of whether the second device is within the vicinity.

In a further aspect, a method may include receiving a request for a search for contacts meeting a criterion; searching a database of contacts for the contacts meeting the criterion and including the contacts meeting the criterion in search results, where the request is associated with a reference contact in the database; determining whether a second device associated with one of the contacts meeting the criterion may be within a vicinity of a first device associated with the reference contact; and ranking the search results based on the determination of whether the second device may be within the vicinity; and ranking the search results based on a correlation between the reference contact and each of one or more of the search results.

Additionally, correlating the reference one or more search results may include comparing a profession, an interest, a calendar event, a search time, a location, a physical address, a network address, a cell tower identifier, a wireless local area network identifier, a country code, an area code, or an age associated with the reference record with a profession, an interest, a calendar event, an update time, a location, a physical address, a network address, a cell tower identifier, a wireless local area network identifier, a country code, an area code, or an age, respectively, associated with the one or more search results.

Additionally, correlating the reference contact with the one or more search results may include comparing a physical address associated with the reference contact with a physical address associated with the one or more search results.

In an additional aspect, a device may include a receiver to receive a request from a first mobile device for a search for contacts meeting a criterion. The device may further include a processor to search a database of contacts for the contacts meeting the criterion and including the contacts meeting the criterion in search results, determine whether a second mobile device associated with one of the contacts meeting the criterion may be within a vicinity of the first mobile device; and rank the search results based on the determination.

Additionally, the vicinity may include ten meters and the first and second devices include mobile telephones.

Additionally, the processor may be further configured to determine a database distance between a reference contact and each of one or more of the search results, where the request is associated with the reference contact in the database of contacts; and rank the search results based on the determined database distance; where the database of contacts includes a plurality of subsets of contacts, where contacts in the subsets are linked to another contact in the database of contacts; where determining a database distance between the reference contact and each of the one or more of the search results includes determining the number of links between the reference contact and each of one or more of the search results.

Additionally, the contacts of subsets may be linked to the other contact in the database of contacts by virtue of a placed or received call, a sent or received text message, a sent or received multi-media message, calendar event information, history of a shared file, photograph meta data, or a recognized face in a photograph.

Additionally, the processor may be further configured to rank the search results based on a correlation between the reference contact and each of the one or more of the search results.

In an additional aspect, a device may include means for receiving a request from a first mobile device for a search for contacts meeting a criterion; means for searching a database of contacts for the contacts meeting the criterion and including the contacts meeting the criterion in search results; means for determining whether a second mobile device associated with one of the contacts meeting the criterion may be within a vicinity of the first mobile device; and means for ranking the search results based on the determination.

Additionally, the database of contacts may be stored in a server separate from the first mobile device and the second mobile device and wherein the device further may include means for delivering the ranked search results to the first mobile device.

Additionally, the request for the search may include a name of a person.

Additionally, the means for determining whether the second mobile device associated with the one of the contacts meeting the criterion may include means for the first mobile device transmitting electromagnetic radiation directly to the second mobile device.

Additionally, the vicinity may include ten meters and the first and second devices may include mobile telephones.

Additionally, the device further may include means for determining a database distance between a reference contact and each of one or more of the search results, where the request may be associated with a reference contact in the database of contacts; and means for ranking the search results based on the determined database distance; where the database of contacts may include a plurality of subsets of contacts, where contacts in the subsets may be linked to another contact in the database of contacts; where the means for determining a database distance between the reference contact and each of the one or more of the search results may include means for determining the number of links between the reference contact and each of one or more of the search results.

Additionally, the device further may include means for ranking the search results based on a correlation between the reference contact and each of the one or more of the search results.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 3 is a block diagram of an exemplary contact database;

FIG. 6 is a block diagram of an exemplary personal contact database;

DETAILED DESCRIPTION

The following detailed description refers to the accompanying drawings. The same reference numbers in different drawings may identify the same or similar elements. Also, the following detailed description does not limit the scope of the claims. Rather, the claims define the scope of the inventions described herein.

Overview

In embodiments described herein, users of devices may find contacts by searching a contact database. Search results may be ranked based on various criteria, such as, for example, who knows whom, similarity of interests, proximity of user devices, and other criteria described below. Users may review the search results and add contacts to their devices.

Figure 1:
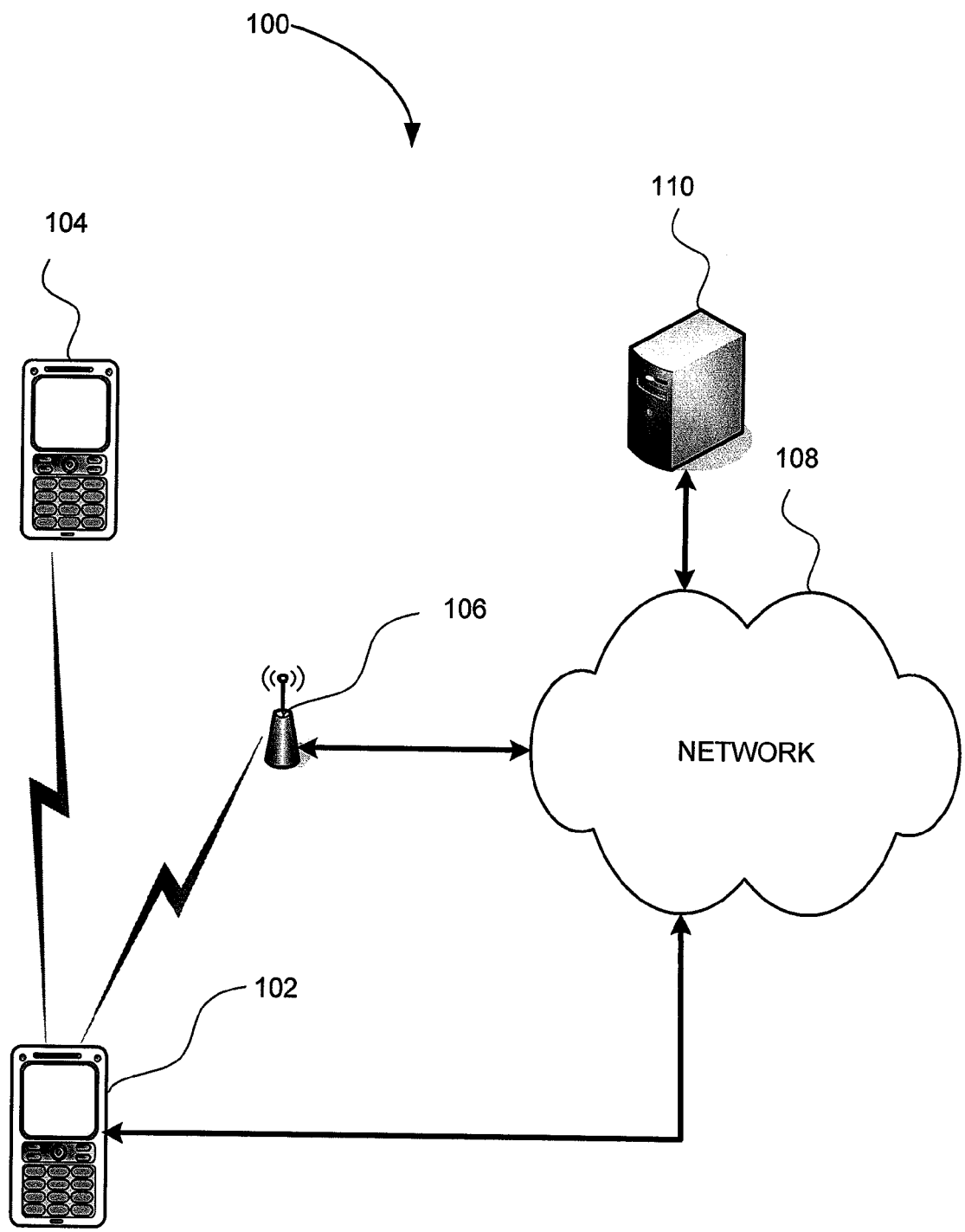
FIG. 1 shows an exemplary environment for embodiments described herein.

FIG. 1 shows an exemplary environment 100 in which embodiments described herein may be implemented. As shown, environment 100 may include client devices 102 and 104, a wireless access point (WAP) 106, a network 108, and a server 110. In other embodiments, environment 100 may include more, fewer, or different components. Moreover, one or more components of environment 100 may perform one or more functions of any other component of environment 100. Furthermore, one or more of client devices 102 and 104, WAP 106, network 108, and server 110 may be remotely located.

Client device 102 may include any of the following devices: a mobile telephone; a personal computer; a telephone, such as a radio telephone; a personal communications system (PCS) terminal that may combine cellular radiotelephone with data processing, facsimile, and/or data communications capabilities; an electronic notepad; a personal music player (PMP); a laptop; a personal computer (PC); a personal digital assistant (PDA) that can include a radiotelephone, pager, Internet/intranet access, web browser, organizer, calendar, and a global positioning system (GPS); or another type of computation or communication device. Client device 104 may include any of the device described above with respect to client device 102 and may operate similarly to client device 102.

WAP 106 may include a device for accessing network 108, such as a router that is able to receive and transmit wireless and/or wired signals, or any other device that provides access to a network. WAP 106 may communicate with client device 102 using any wireless communication protocol. Client devices 102 and 104 may connect to network 108 via WAP 106. In other embodiments, client devices 102 and 104 may connect to network 108 via wired and/or wireless connections.

Network 108 may include the Internet, an ad hoc network, a local area network (LAN), a wide area network (WAN), a metropolitan area network (MAN), a cellular network, a public switched telephone network (PSTN), any other network, or combinations of networks.

Server 110 may include one or more computer systems for hosting server programs, databases, and/or applications. Server 110 may receive a request for uploading or downloading data from applications hosted by client device 102 or 104, process the request, and transmit or receive data to and from client device 102 or 104.

Server 110 may host a database of contacts including, for example, names and corresponding telephone numbers. Server 110 may receive search requests from client device 102 for contact information. Server 110 may perform a search for the contact information, rank the search results, and deliver the ranked searched results to client device 102, for example. A user of client device 102 may make a search request through an application (e.g., a browser) hosted by client device 102. The request may include search terms (e.g., a name) that may be used as a search criterion for the contact database stored in server 110.

Exemplary Server

Figure 2:
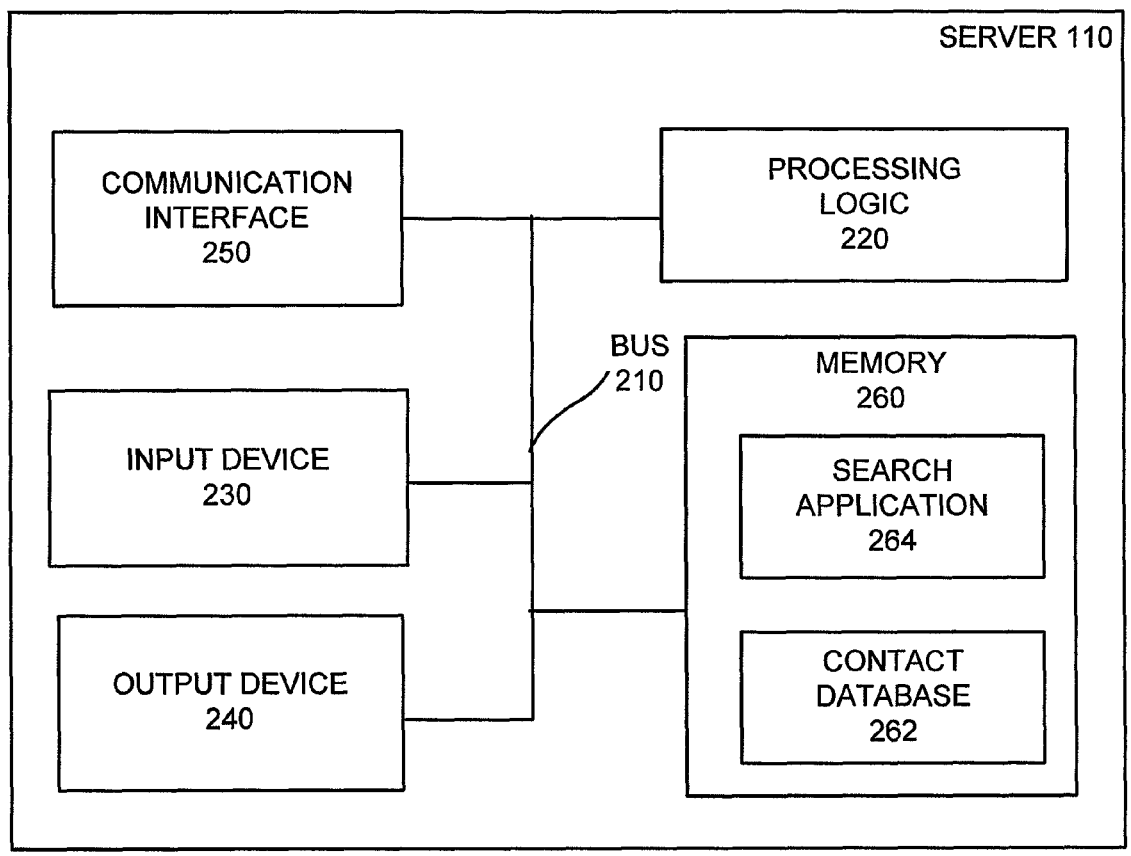
FIG. 2 is a block diagram of exemplary components of a server.

FIG. 2 is a block diagram of exemplary components of server 110. Server 110 may include a bus 210, processing logic 220, an input device 230, an output device 240, a communication interface 250, and a memory 260. Memory 260 may include a contact database 262 and a search application 264. Server 110 may include other components (not shown) that aid in receiving, transmitting, and/or processing data. Moreover, other configurations of components in server 110 are possible. Further, one or more components of server 110 may be remotely located.

Bus 210 may include a path that permits communication among the components of server 110. Processing logic 220 may include any type of processor or microprocessor (or groups of processors or microprocessors) that interprets and executes instructions. In other embodiments, processing logic 220 may include an application-specific integrated circuit ("ASIC"), a field-programmable gate array ("FPGA"), or the like.

Input device 230 may include a device that permits a user to input information into server 110, such as a keyboard, a keypad, a mouse, a pen, a microphone, one or more biometric mechanisms, or the like. Output device 240 may include a device that outputs information to the user, such as a display, a printer, a speaker, etc.

Communication interface 250 may include any transceiver-like mechanism that enables server 110 to communicate with other devices and/or systems. Memory 260 may include a random access memory ("RAM") or another type of dynamic storage device that may store information and instructions for execution by processing logic 220; a read-only memory ("ROM") device or another type of static storage device that may store static information and instructions for use by processing logic 220; and/or some other type of magnetic or optical recording medium and its corresponding drive, e.g., a hard disk drive ("HDD"), for storing information and/or instructions.

As mentioned above, memory 260 may store contact database 262 and search application 264, for example. Contact database 262 may store contact information of users such as, for example, names and corresponding telephone numbers. Search application 264 may search contact database 262, provide search results, and rank the search results. Memory 260 may possibly store applications other than search application 264.

Server 110 may perform certain operations, as described in detail below. Server 110 may perform these operations in response to processing logic 220 executing software instructions contained in a computer-readable medium, such as memory 260. A computer-readable medium may be defined as a physical or logical memory device and/or carrier wave. The software instructions may be read into memory 260 from another computer-readable medium or from another device via communication interface 250. The software instructions contained in memory 260 may cause processing logic 220 to perform processes that are described below.

FIG. 3 is a block diagram of exemplary contact database 262. Contact database 262 may include a contact ID field 304, a name field 308, a home address field 312, a phone number field 316, a work address field 324, a profession field 336, an interests field 340, and a contact list field 344. Each contact, e.g., row, in contact database 262 may be considered an entry in a phone book, e.g., the "white pages" and/or "yellow pages" for example. Contact database 262 may, however, include much more information and functionality than the "white pages" and "yellow pages."

Contact ID field 304 may include a unique identifier of a contact. Name field 308 may include the given name, e.g., first name, and family name, e.g., the last name, of the contact. In one embodiment, multiple name fields may be provided for family name, given name, middle name, and nickname, for example. Home address field 312 may include the postal address of the home of the contact. Phone number field 316 may include the telephone number of the contact. Work address field 324 may include the postal address of the work place of the contact. Profession field 336 may include a description of the contact's profession, such as "nurse," "engineer," etc. Interests field 340 may include a description of a contact's interests, such as "hiking," "skiing," etc. Contact list field 344 may include a list of the contact's contacts.

In other words, contact list field includes the contact's "telephone book." In one embodiment, contact list field 344 may include a list of contact IDs.

Contact database 262 may include additional or fewer fields than illustrated in FIG. 3. For example, contact database 262 may include a field for an ICQ number, a business email address, a personal email address, an age, a work phone number, additional telephone numbers, a Skype address, a birthday, a web page, a network address, e.g., an IP address, and/or a universal resource indicator (URI).

Contact database 262 may also include a private field indicating what fields in a contact are private, e.g., may not be used for search purposes. Contact database 262 may also include a private field indicating what contacts in contact list field 344 may not be used for search purposes.

Contact database 262 may include a time/date field indicating when contacts in contact list field 344 were added to contact list field 344. Contact database 262 may include a date/time field indicating when a contact was last updated. Contact database 262 may include a field for calendar information indicating a place and a time, e.g., an event, where and when a contact will be. Contact database 262 may include a field indicating the current mobile phone tower ID, e.g., location, or wireless local-area-network (WLAN) ID, e.g., an IP address or location.

Contact database 262 may store information regarding searches performed on database 262 and which contacts added what other contacts as a result of these searches. For example, contact database 262 may include a time/date field indicating when a contact was returned as a result of a search and which contacts in contact database 262 added the returned contact to contact list field 344 as a result of the search.

Contact database 262 may include fields for recently received calls, recently placed calls, recently received messages, and/or recently sent messages (including text messages, short-message system (SMS) messages, multi-media system (MMS) messages, and/or e-mail messages). Such fields may include a list of contact IDs identifying contacts from which calls were received, to which calls were placed, from which messages were received, and/or to which messages were sent.

Contact database 262, or a separate database, may include fields recording a history of shared files, such as files received and sent via Bluetooth. For example, if a file goes from user A to user B to user C, contact database 262 may store such information.

Contact database 262, or a separate database, may store photographs of contacts and/or an entire photo album associated with a particular contact. Each photo in the photo album may include meta data, which may include the names of the individuals in the photographs, for example, or a contact ID.

Exemplary contact database 262 in FIG. 3 includes eight contacts with contact IDs (in contact ID field 304) ranging from 1 through 8. Jennie Hakansson (contact ID 1) lives and works in Sodermalm, Stockholm, is an engineer, and likes to ski. Jennie's phone number is +461234. Jennie's contacts are Helena Nilsson (contact ID 3) and Bernth Blomquist (contact ID 4).

Erik Johansson (contact ID 2) lives and works in Sodermalm, Stockholm, is a police officer, and likes to hike. Erik's (contact ID 2's) phone number is +463456. Erik's (contact ID 2's) contacts are Helena Nilsson (contact ID 3) and Bernth Blomquist (contact ID 4). Helena Nilsson (contact ID 3) lives and works in Sodermalm, Stockholm, is an engineer, and likes to ski. Helena's phone number is +464567 and Helena's contacts include Jennie (contact ID 1), Erik Johansson (contact ID 2), and Sabina Nystrom (contact ID 4).

Bernth Blomquist (contact ID 4) lives and works in Lund. Bernth is a lawyer and likes to hike. Bernth's phone number is +46 5678 and Bernth's contacts include Erik Johansson (contact ID 5) and Lars Nordstrom (contact ID 6). Erik Johansson (contact ID 5) lives and works in Sodermalm, Stockholm, is an engineer, and likes hunting. Erik's (contact ID 5's) phone number is +467890 and Erik's (contact ID 5's) contacts are Lars (contact ID 6), Erik Johansson (contact ID 7) and Helena (contact ID 3). Lars Nordstrom (contact ID 6) lives in Lund but commutes to Gothenburg for work. Lars is an engineer and likes Linux and Star Trek. Lars's phone number is +46 4321 and Erik Johansson (contact ID 7) is Lars's only contact.

Erik Johansson (contact ID 7) lives in Norrmalm, Stockholm, but commutes to Gamla Stan, Stockholm, for work. Erik (contact ID 7) is an accountant and likes to travel and ski. Erik's (contact ID 7's) phone number is +465432 and his contacts are Jennie Hakansson (contact ID 1) and Erik Johansson (contact ID 2). Sabina Nystrom (contact ID 8) lives and works in Visby, Gotland, tends bar, and likes to go sunning and swimming. Sabina's phone number is +466543. Sabina's doesn't have any contacts.

As shown, Jennie's contacts include the contacts with contact ID 3 and contact ID 4. Thus, Jennie's contacts could be considered a "subset" of contact database 262. Likewise, Helena's contacts include the contacts with contact ID 1, contact ID 2, and contact ID 4. Thus, Helena's contacts could be considered another "subset" of contact database 262. Further, the contact IDs listed in contact list field 344 may be considered "links" and/or "pointers."

Exemplary Client Devices

Figure 4:
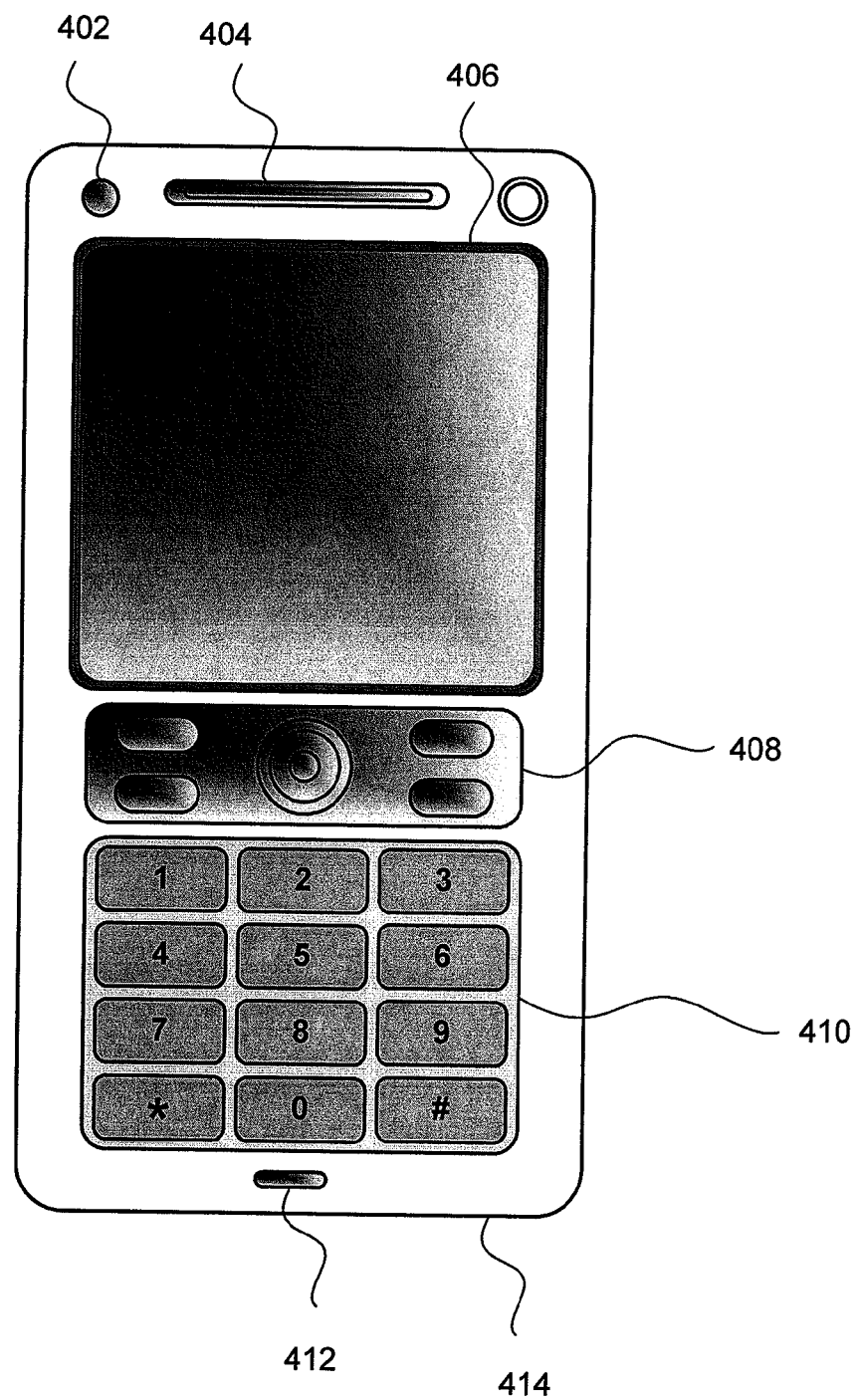
FIG. 4 is an exemplary block diagram of a client device.

FIG. 4 is an exemplary diagram of client device 102. As illustrated, client device 102 may include a camera 402, a speaker 404, a display 406, control buttons 408, a keypad 410, a microphone 412, and a housing 414. Client device 102 may include other components (not shown in FIG. 4) that aid in receiving, transmitting, and/or processing data. Moreover, other configurations of components in client device 102 are possible. Furthermore, one or more components of client device may be remotely located.

Camera 402 may enable a user to view, capture and store media (e.g., images, video clips) of a subject in front of device 102. Speaker 404 may provide audible information to a user of client device 102. Display 406 may include a display screen to provide visual information to the user, such as video images or pictures, and may include a touch screen to accept inputs from a user. For example, display 406 may provide information regarding incoming or outgoing telephone calls, games, telephone numbers, contact information, the current time, e-mail, etc. Control buttons 408 may permit the user to interact with client device 102 to cause client device 102 to perform one or more operations, such as place or receive a telephone call. Keypad 410 may include a standard telephone keypad and may include additional keys to enable inputting (e.g., typing) information into client device 102. Microphone 412 may receive audible information from the user. Housing 414 may provide a casing for components of client device 102 and may protect the components from outside elements. Client device 104 may include similar components as client device 102 and may operate similarly.

Figure 5:
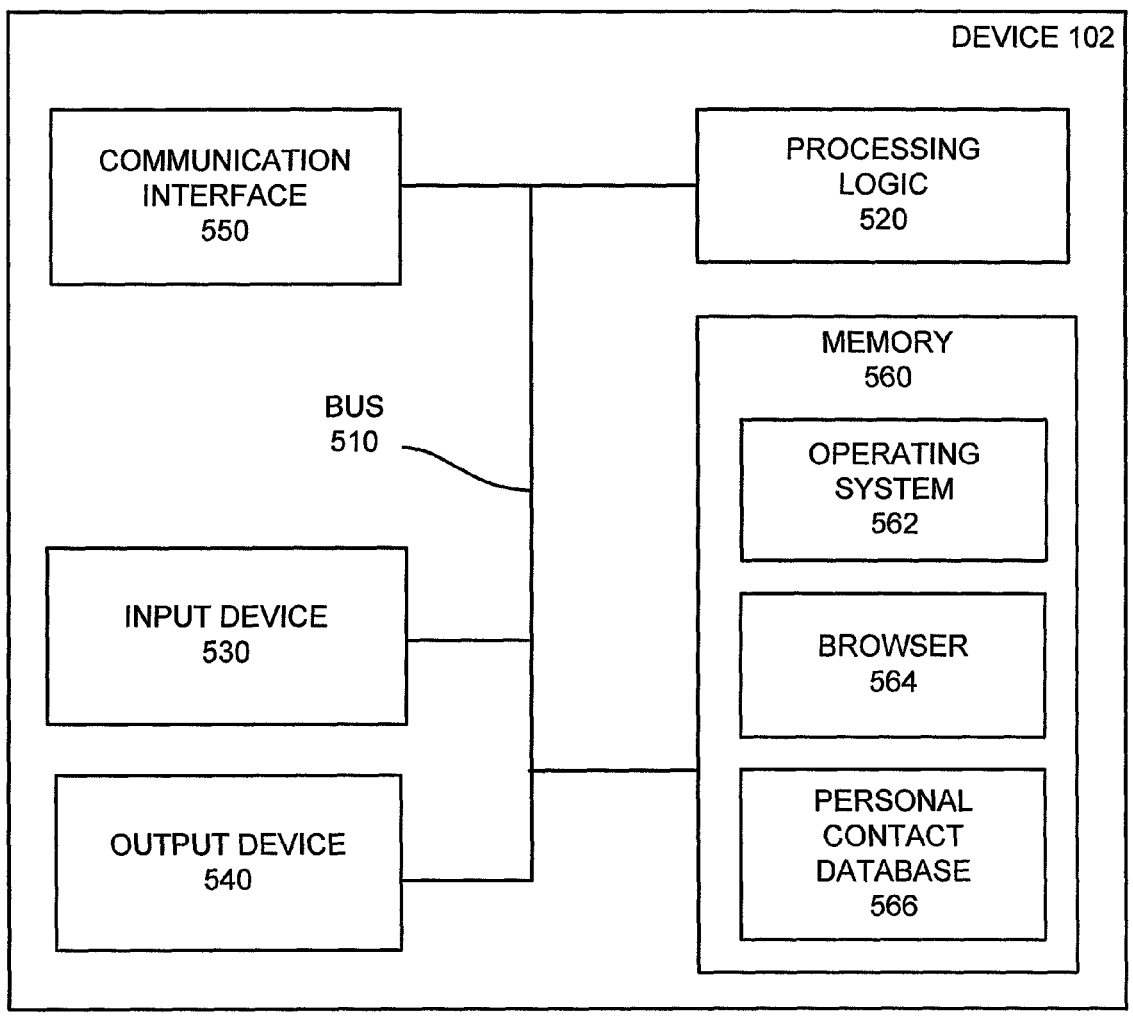
FIG. 5 is a diagram of exemplary components of a client device.

FIG. 5 is a diagram of exemplary components of client device 102 of FIG. 4. As shown in FIG. 5, client device 102 may include a bus 510, processing logic 520, an input device 530, an output device 540, a communication interface 550, and memory 260. Memory 560 may include an operating system 562, a browser 564, and a personal contact database 566. Client device 102 may include other components (not shown in FIG. 5) that aid in receiving, transmitting, storing and/or processing data. Moreover, other configurations of components in client device 102 are possible. Further, one or more components of client device may be remotely located.

Processing logic 520 may include a processor, microprocessor, an ASIC, or an FPGA. Processing logic 520 may include data structures or software programs to control operation of device 102 and its components.

Input device 530 may include mechanisms for inputting information into client device 102. Input device 530 may include microphone 412 to receive audio signals, keys 408 or 410 to permit data and control commands to be input. Output device 540 may include one or more devices for outputting information from client device 102. Output device 540 may include speaker 404 to output audio signals, display 406 to output visual information, or a vibrator (not shown) to alert a user.

Input device 530 and output device 540 may allow the user of client device 102 to receive a menu of options. The menu may allow the user to select various functions or modes associated with applications executed by client device 102. Input device 530 and output device 540 may allow the user to activate a particular mode or application, such as a mode defined by an application running in client device 102.

Communication interface 550 may include, for example, a universal serial bus (USB) port for communications over a cable. Communication interface 550 may include a transmitter that may convert baseband signals from processing logic 520 to radio frequency (RF) signals and/or a receiver that may convert RF signals to baseband signals. Alternatively, communication interface 550 may include a transceiver to perform functions of both a transmitter and a receiver. Communication interface 550 may connect to an antenna for transmission and reception of the RF signals. Communication interface 550 may incorporate the Bluetooth standard or a USB serial port standard. Communication interface 550, for example, may send signals, such as Bluetooth signals and/or electromagnetic signals, to other devices within a vicinity of the client device 102, such as within 1 meter, 10 meters, 15 meters, 20 meters, 25 meters, or 30 meters, for example.

Memory 560 may include a HDD, a RAM, a ROM, flash memory, a removable memory, and/or another type of memory to store data and/or instructions that may be used by processing logic 520 (e.g., any type of a computer-readable medium). As mentioned above, memory 560 may store operating system 562, browser 564, and personal contact database 566. Operating system 562 may provide a software platform on top of which application programs, such as browser 564, can run. Browser 564 may allow a user to interact with web resources at websites or servers, such as server 110. A user may use browser 564 to submit search queries to search engines in network 108 and/or server 110 and to view search results that are received at client device 102 from the search engines and/or server 110. Memory 560 may include other application programs not shown in FIG. 5.

FIG. 6 is a block diagram of exemplary personal contact database 566. Personal contact database 566 may include a my-contact ID field 602. My-contact ID field 602 may identify the user associated with client device 102. In database 566 shown in FIG. 6, my-contact ID field 602 has the value of 1, which corresponds to Jennie Hakansson in contact database 262. In other words, client device 102 belongs to Jennie Hakansson and includes her personal contact list, e.g., her personal phone book. Thus, personal contact database 262 may include the contact information for contact ID 2 and contact ID 3 from contact database 262 because those contacts (with ID of 2 and 3) are listed in contact database 262 as being Jennie's contacts.

Like contact database 262, personal contact database 566 may include a contact ID field 304, a name field 308, a home address field 312, a phone number field 316, a work address field 324, a profession field 336, an interests field 340, and a contact list field 344. Each contact, e.g., row, in personal contact database 566 may be considered an entry in a phone book.

Personal contact database 566 may include additional or fewer fields than illustrated in FIG. 6. For example, personal contact database 566 may include a field for an ICQ number, a Skype address, a birthday, a web page, and/or a universal resource indicator (URI). In addition, although personal contact database 566 has a similar number and type of fields as contact database 262, personal contact database 566 may have more ore fewer fields than contact database 262. Personal contact database 566 may include all the fields discussed above with respect to contact database 262. Personal contact database 566, or another database in client device 262, may also include a user's photo album, for example. Each photo in the photo album may include meta data, which may include the names of the individuals in the photographs, for example, or contact IDs of people in the photographs.

Contact information for contact ID 1 (the contact information for Jennie herself) may be provided in Jennie's client device, e.g., client device 102, for Jennie's convenience. Jennie may edit her own contact information if, for example, she changes jobs and has a new work address. When Jennie's client device, e.g., client device 102, communicates with server 110, server 110 may update contact database 262 with Jennie's new contact information. Likewise, when other client devices, such as client device 104, communicate with server 110, those client devices may receive Jennie's new contact information in respective personal contact databases.

Exemplary Processeses

Figure 7:
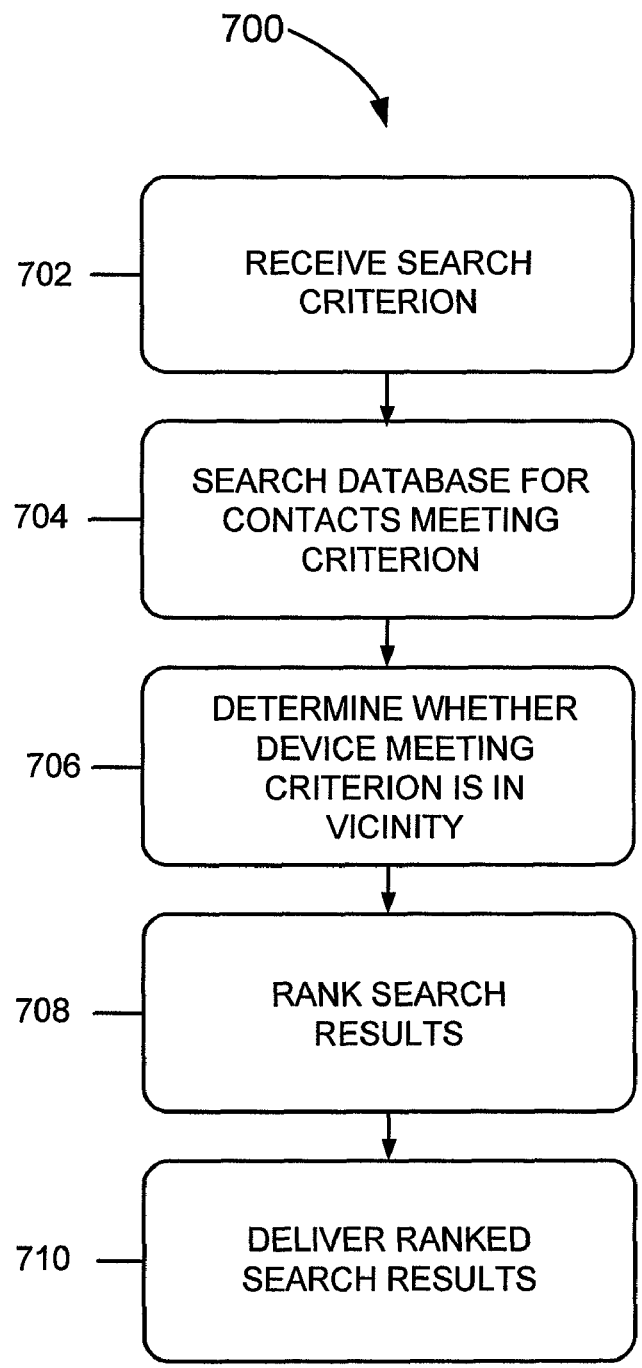
FIGS. 7, 8, and 9 are flowcharts of exemplary processes for searching a contact database and ranking search results.

FIG. 7 is a flowchart of a process 700 for searching a contact database and ranking search results according to an exemplary embodiment. Search criterion may be received (block 702). For example, server 110 may receive a search request from the user of client device 102 (e.g., Jennie Hakansson) for contact information of an "Erik Johansson." Contact database 262 may be searched for contacts meeting the search criterion (block 704). Server 110 may search contact database 262 for all the contacts with the name "Erik Johansson," for example, which may be many. In one embodiment, server 110 may search contact database 262 for names that sound like "Erik Johansson." In other words, server 110 may find alternative spellings of "Erik Johansson," such as "Eric Johansson."

Whether a device associated with a contact meeting the search criterion is within a vicinity may be determined (block 706). Server 110 may have location information about client device 102 and client device 104, e.g., devices 102 and 104 being located on the same street. Further, server 110 may associate device 104 with a contact in database 262 meeting the search criterion, e.g., having the name field 308 of "Erik Johansson." In other words, client device 104 may belong to a "Erik Johansson" and client device 104 may be very close to client device 102.

The search results may be ranked based on the determination of block 706 (block 708). Server 110 may rank the contact in the search result associated with device 104 closer to the top than other contacts in the search results. For example, server 110 may rank the contact in the search result associated with device 104 first. The search results may be delivered (block 710). The ranked search results may be delivered by server 110 to client device 102, which asked for the search in the first place. Having received the search results, the user of client device 102 may browse and select the appropriate contact, if any, for including in his or her contact list.

Although exemplary process 700 of FIG. 7 shows blocks 702-710 in a particular order, process 700 is not limited to blocks 702-710 being in this particular order. For example, block 706 may be performed before block 704. Further, although, in the example above, many blocks may be performed by server 110, blocks may also be performed by client device 102. For example, client device 102 may rank the search results knowing that client device 104, associated with "Erik Johansson," is nearby.

Whether a device associated with a contact meeting the search criterion is within the vicinity (block 706) may be determined in a variety of ways. Client devices 102 and 104 may include GPS devices that determine the latitude and longitude and transmit this information back to server 110. Server 110 may also have information regarding the location of the wireless access points, such as WAP 106, used by client devices 102 and 104. Client device 102 may also be in direct communication with client device 104 using, for example, Bluetooth technology. Thus, client device 102 and/or client device 104 may be able to report to server 110 the devices within each other's Bluetooth range. Server 110 may use any combination of these techniques to determine the physical location of devices, such as client devices 102 and 104.

Figure 8:
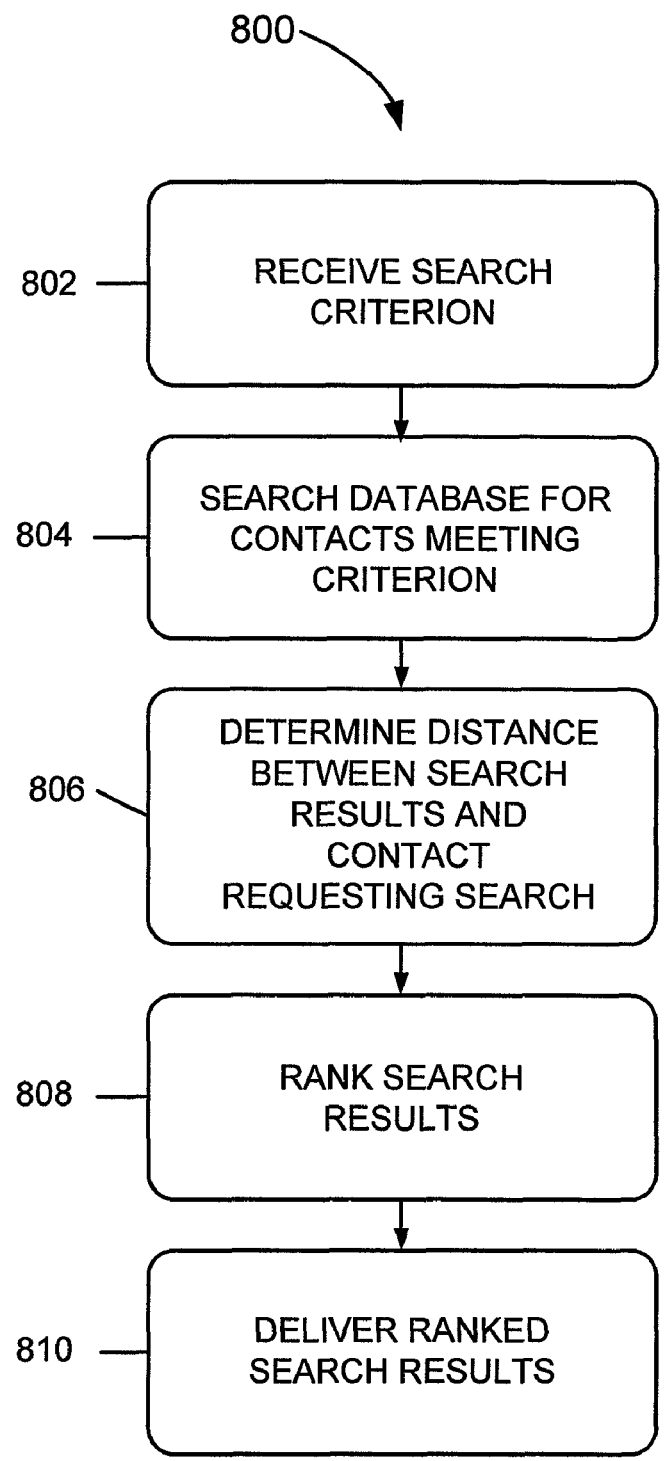

FIG. 8 is a flowchart of a process 800 for searching a contact database and ranking search results according to another exemplary embodiment. Search criterion may be received (block 802). For example, server 110 may receive a search request from the user of client device 102 (e.g., Jennie Hakansson) requesting contact information of an "Erik Johansson." Contact database 262 may be searched for contacts meeting the search criterion (block 804). For example, server 110 may search contact database 262 for all the contacts with the name "Erik Johansson."

A "database distance" between the contact requesting the search and the contacts in the search results may be determined (block 806). Database distance may include "who knows whom." Database distance may be measured by the number of links between the contact requesting the search (the "reference" contact) and each contact meeting the criterion. For example, client device 102 may have a phone number of +461234, e.g., client device 102 may be associated with the contact having a contact ID of 1 (Jennie Hakansson). Jennie Hakansson (contact ID 1) has Helena Nilsson (contact ID 3) as a contact and Helena Nilsson (contact ID 3) has Erik Johansson (contact ID 2) in her contact list. Therefore, the database distance between Jennie Hakansson (contact ID 1) and Erik Johansson (contact ID 2) may be two, since there are two "links" between Jennie Nilsson (contact ID 1) and Erik Johansson (contact ID 2).

On the other hand, there is an Erik Johansson (contact ID 7) who has Jennie Hakansson (contact ID 1) in his contact list. Therefore, the database distance between Erik Johansson (contact ID 7) and Jennie Hakansson (contact ID 1) may be one, since there is one link between Jennie Nilsson (contact ID 2) and Erik Johansson (contact ID 2).

Further, there is an Erik Johansson (contact ID 5) that lists Helena Nilsson (contact ID 3) in his contact list field 344. Jennie Hakensson (contact ID 1) also lists Helena Nilsson (contact ID 3) in her contact list field. Therefore, the database distance between Jennie Hakensson (contact ID 1) and Erik Johansson (contact ID 5) may also be two, e.g., there are two links between Jennie Hakansson (contact ID 1) and Erik Johnsson (contact ID 5).

In one embodiment, a link may not be counted if the contact listed in contact list 344 is marked as private.

The search results may be ranked based on the database distance determinations of block 806 (block 808). Although there are at least three Erik Johanssons in contact database 262, the Erik Johansson having a contact ID of 7 (distance of one) may be listed before the Erik Johansson having a contact ID of 5 (distance of two) and the Erik Johansson having a contact ID of 2 (distance of two). Although there is a tie between the Erik Johansson having a contact ID of 2 and the Erik Johansson having a contact ID of 5, different "links" may be given a different weight. For example, Jennie Hakansson (contact ID 1) "forward" links to Helena Nilsson (contact ID 3) (e.g., Jennie's contact list points to Helena), which forward links to Erik Johansson (contact ID 3). A forward link may be given a weight of 1, thus the database distance between Jennie Hakansson (contact ID 1) and Erik Johansson (contact ID 2) may be two. On the other hand, Jennie Hakansson (contact ID 1) forward links to Helena Nilsson (contact ID 3) which "reverse" links to Erik Johansson (contact ID 5) (e.g., contact ID 5 points to contact ID 3, not vice versa). A reverse link may be given a weight of 0.8, meaning that the weighted database distance between Jennie Hakansson (contact ID 1) and Erik Johansson (contact ID 5) may be 1.8. Thus, Erik Johansson having a contact ID of 5 (weighted distance of 1.8) may be listed before the Erik Johansson having a contact ID of 2 (weighted distance of 2). The search results may be delivered (block 810). The search results may be transmitted from server 110 to client device 102. Having received the search results, the user of client device 102 may browse and select the appropriate contact, if any, for including in his or her contact list.

There may also be parallel paths, e.g., multiple or different ways of linking, from a reference contact to a contact meeting the criterion. In such a situation, multiple paths may shorten the weighted distance between the reference contact and the contact meeting the criterion. In one embodiment, to calculated the weighted distance for parallel paths, the reciprocal of the weighted database distance may be equal to the sum of the reciprocals of one or more of the individual database distances.

As discussed above, contact database 262 and/or personal contact database 566 may include fields for recently received calls, recently placed calls, recently received messages, and/or recently sent messages (including text messages, SMS messages, MMS messages, and/or e-mail messages). Such fields may include a list of contact IDs identifying contacts from which calls were received, to which calls were placed, from which messages were received, and/or to which messages were sent. In one embodiment, such fields may be used in conjunction with contact list field 344 to determine database distance between contacts. In another embodiment, such fields may be used on their own to determine database distance between contacts. For example, if Jennie Hakansson (contact ID 1) recently received a text message from Erik Johansson (contact ID 7), then the database distance between Jennie Hakansson (contact ID 1) and Erik Johansson (contact ID 7) may be one. Erik Johansson (contact ID 7) may be ranked accordingly in the search results. Alternatively, if one of Jennie Hakansson's (contact ID 1's) contacts received (or sent) a text message from (or to) Erik Johansson (contact ID 7), then the database distance may be calculated from Jennie to Jennie's contact (first link) and then from Jennie's contact to Erik Johansson (second link)—for a database distance of two. Thus, all other things being equal, and Erik Johansson that is more "social" (more messages and/or phone calls) with Jennie's contacts may rank higher in a search result than an Erik Johansson that is not social—as a possible result of their being more parallel paths (reducing the database distance) with the social Erik Johansson.

In one embodiment, calendar information may be used in conjunction with contact list field 344 to determine database distance between contacts. In another embodiment, calendar information may be used on its own to determine database distance. For example, if Jennie Hakansson (contact ID 1) plans to be at Erik Johansson's (contact ID 7's) house on his birthday (and Erik Johansson (contact ID 7) will be there too), then the database distance between Jennie Hakansson (contact ID 1) and Erik Johansson (contact ID 7) may be one. Erik Johansson (contact ID 7) may be ranked accordingly in the search results. Alternatively, if one of Jennie Hakansson's (contact ID 1's) contacts plans to be at Erik Johansson's (contact ID 7's) house on his birthday (and Erik Johansson (contact ID 7) will be there too), then the database distance between Jennie Hakansson (contact ID 1) may be calculated from Jennie to Jennie's contact (first link) to Erik Johansson's birthday party, to Erik Johansson (contact ID 7)—for a distance of three, for example.

In one embodiment, file history of shared files may be used in conjunction with contact list field 344 to determine database distance between contacts. In another embodiment, calendar information may be used on its own to determine database distance. For example, if Jennie Hakansson (contact ID 1) shared a file with Erik Johansson (contact ID 7), then the database distance between Jennie Hakansson (contact ID 1) and Erik Johansson (contact ID 7) may be one. Erik Johansson (contact ID 7) may be ranked accordingly in the search results. Alternatively, if one of Jennie Hakansson's (contact ID 1's) contacts shared a file with Erik Johansson (contact ID 7), then the database distance between Jennie Hakansson (contact ID 1) may be calculated from Jennie to Jennie's contact (first link) to Erik Johansson (contact ID 7) (second link)—for a distance of two, for example.

In one embodiment, meta data of photographs may be used in conjunction with contact list field 344 to determine database distance between contacts. In another embodiment, meta data of photographs may be used on its own to determine database distance.

Although exemplary process 800 of FIG. 8 shows blocks 802-810 in a particular order, exemplary process 800 is not limited to blocks 802-810 being in this particular order. For example, block 806 may be performed before block 808. Further, although, in the example above, many blocks may be performed by server 110, blocks may also be performed by client device 102. For example, client device 102 may rank the search results.

Figure 9:
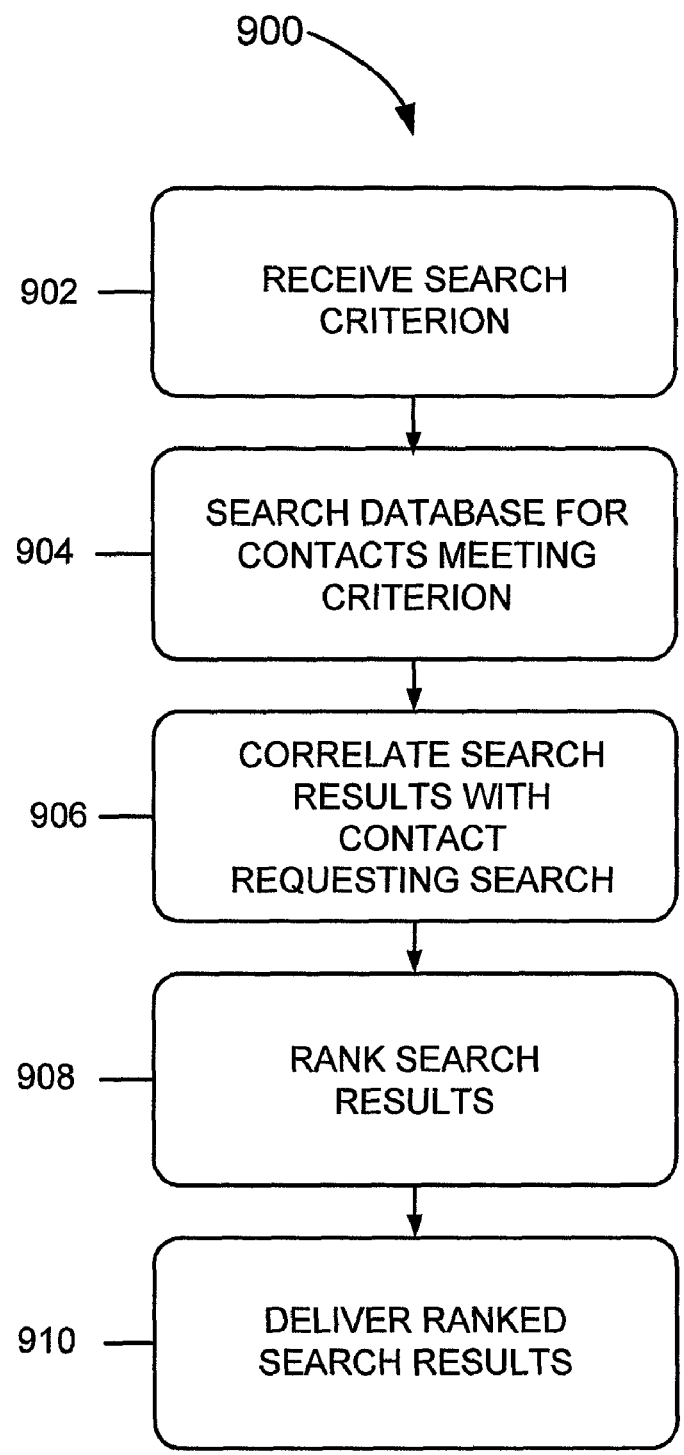

FIG. 9 is a flowchart of a process 900 for searching a contact database and ranking search results according to a further exemplary embodiment. Search criterion may be received (block 902). For example, server 110 may receive a search request from the user of client device 102 requesting contact information of an "Erik Johansson." Client device 102 may be associated with contact ID of 1, e.g., Jennie Hakansson. Contact database 262 may be searched for contacts meeting the search criterion (block 904). For example, server 110 may search contact database 262 for all the contacts with the name "Erik Johansson."

The contacts meeting the criterion (e.g., the search results) may be correlated with the contact requesting the search (e.g., the reference contact) (block 906). The correlation of a reference contact and a search result may take many forms. For example, different fields in contact database 262 may carry different weights during the correlation. Work address field 324 may have a greater weight than interests field 340, for example. A correlation may also take into account the physical distance between locations, such as the physical distance (in kilometers, for example) between home addresses. Close proximity may (such as two neighbors) may be given a high weight. The physical distance between locations may include the physical distance between mobile phone tower ID's, WLAN IDs, and/or network addresses, e.g., IP addresses.

A correlation may also take into account the ages of the contacts meeting the criterion and the age of the reference contact. A correlation may take into account the network addresses of the contacts meeting the criterion and the network address of the reference contact (e.g., physically closer IP addresses would have a higher correlation). A correlation may take into account the country and/or area code of the contacts meeting the criterion and the reference contact (similar or nearby country/area codes may have a higher correlation). A correlation may take into account the country and/or area code of the contacts meeting the criterion and a country/area code inputted as a search criterion by the user.

In one embodiment, a correlation does not take into account a field of a contact marked as private using a private field.

A correlation may also take into account the date/time field indicating when contacts meeting the criterion were last updated and when the reference contact generated the search request (more recently updated contacts may have a higher correlation). A correlation may take into account the date/time field indicting when contacts meeting the criterion were added to a contact list field 344 in a contact in the reference contact's contact list field 344 (where more recently added contacts would have a higher correlation). In other words, if a friend just added an "Erik Johansson" to a contact list, then that "Erik Johansson" would have a higher correlation.

A correlation may take into account calendar information, e.g., event information, indicating when contacts meeting the criterion may be in the same place at the same time as the reference contact. A contact meeting the criterion and also indicating that the contact will be in the same place at the same time may have a higher correlation than other contacts.

A correlation may take into account recently received calls, recently placed calls, recently received messages, and/or recently sent messages (including text messages, SMS messages, MMS messages, and/or e-mail messages). For example, contacts meeting the criterion that were recently called or messaged may have a higher correlation than other contacts meeting the criterion.

A correlation may take into account file sharing history. For example, contacts meeting the criterion that recently received a shared file from the reference contact may have a higher correlation than other contacts meeting the criterion.

A correlation may take into account similarities between photographs of contacts meeting the criterion and photographs in a users' photo album. For example, a contact meeting the criterion whose name also matches meta data in the reference contact's photo album may have a higher correlation than other contacts meeting the criterion. In another embodiment, a contact meeting the criterion that also looks like a person in a reference contact's photo album may have a higher correlation than other contacts. In this embodiment, facial recognition software may be used.

The following is one example of the correlation of a reference contact and search results: The search results may include contact IDs 2, 5, and 7. A correlation may reveal that Jennie Hakansson and Erik Johansson (contact ID 5) are both engineers who work and live in Sodermalm. Therefore, the correlation between Jennie Hakansson (contact ID 1) and Erik Johansson (contact ID 5), for example, may be 3. A correlation may reveal that Jennie Hakansson and Erik Johansson (contact ID 2) both work and live in Sodermalm, but do not share a profession or any interests. Therefore, the correlation between Jennie Hakansson (contact ID 1) and Erik Johansson (contact ID 5), for example, may be two. A correlation may reveal that Jennie Hakansson and Erik Johnsson (contact ID 7) both like skiing, but have nothing else in common. Thus, the correlation between Jennie Hakansson (contact ID 1) and Erik Johansson (contact ID 7), for example, may have a correlation of one.

The search results may be ranked based on the determination of block 906 (block 908). In the example above, Erik Johnsson (contact ID 5) may be ranked before Erik Johansson (contact ID 2) and Erik Johansson (contact ID 2) may be ranked before Erik Johansson (contact ID 7). The search results may be delivered (block 910). The ranked search results may be delivered from server 110 to client device 102. Having received the search results, the user of client device 102 may browse and select the appropriate contact, if any, for including in his or her contact list.

Although exemplary process 900 of FIG. 9 shows blocks 902-910 in a particular order, process 900 is not limited to blocks 902-910 being in this particular order. Also, some blocks described above as being performed by server 110 may also be performed by client device 102. For example, client device 102 may correlate and rank contacts.

Process 700, 800, and 900 may be combined in various fashions to create different ranking methods. For example, a ranking could be based on database distance (e.g., process 800), contact correlation (e.g., process 900), and proximity of devices associated with contacts (e.g., process 700).

In one embodiment, server 110 or device 102 may perform a search of database 262 as a user is entering a search criterion. In this embodiment, server 110 or device 102 may suggest a search result. In one embodiment, a search result may be suggested by auto-completing search input fields.

In the examples above, a full name is used as a search criterion. In one embodiment, searches may be performed on a given name, family name, middle name, or on part of a name, such as the first character of a family name, for example. Criterion other than name may be used, such as location, email address, etc. Further, instead of searching for a contact, a user may ask that a contact list be automatically populated. For example, if Jennie Hakansson moved into a new neighborhood, Jennie may ask that her client device 102 be populated with the contact information of all her new neighbors. If Jennie Hakansson starts to date Lars Nordstrom, Jennie may ask that her client device 102 be populated with her boyfriend's contacts who also have similar interests. If Jennie Hakansson does not want to fill her contact list field 344 one contact at a time, she could ask that her contact list field 344 be populated with all contacts with a database distance of two or less.

CONCLUSION

Accordingly, in embodiments described herein, users of devices may find contacts by searching a contact database. Search results may be ranked based on various criteria, such as, for example, database distance, a correlation of contact information, proximity of user devices, or other criteria.

The foregoing description of embodiments provides illustration and description, but is not intended to be exhaustive or to limit the invention to the precise form disclosed. Modifications and variations are possible in light of the above teachings.

For example, while series of blocks have been described with regard to some figures, the order of the blocks may be modified in other embodiments. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent that aspects of the invention, as described above, may be implemented in many different forms of software, firmware, and hardware in the embodiments illustrated in the figures. The actual software code or specialized control hardware used to implement aspects consistent with principles of the invention is not limiting of the invention. Thus, the operation and behavior of the aspects were described without reference to the specific software code—it being understood that one would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method performed by a server device, the method comprising:
 receiving, by the server device from a mobile device corresponding to a reference contact in a database of contacts, a request for contacts in the database of contacts linked, via one or more other contacts in the database of contacts, to one or more contacts, associated with the reference contact, identified in contact information for a subset of the database of contacts;
 searching, by a processor of the server device, contact information for the one or more other contacts in the database of contacts to identify a type and a number of contact links linking each of the requested contacts to the one or more contacts identified in the contact information for the subset of the database of contacts;
 determining, by a processor of the server device, a database distance between the reference contact and each of the requested contacts, based on the type and the number of the contact links linking each of the requested contacts to the one or more contacts identified in the contact information for the subset of the database of contacts;
 determining, by a processor of the server device, a proximity of respective mobile devices, identified in contact information associated with different ones of the requested contacts, relative to the first mobile device;
 ranking, by a processor of the server device, the requested contacts based on:
  the determined database distances and
  the determined proximities; and providing the ranked contacts and at least a phone number identified in the contact information associated with each of the respective mobile devices, to the first mobile device.

2. The method of claim 1, wherein the request comprises a name of a person corresponding to the requested contacts.

3. The method of claim 1, wherein determining a proximity of the respective mobile devices includes the first mobile device transmitting electromagnetic radiation directly to at least one of the respective mobile devices.

4. The method of claim 3, wherein the electromagnetic radiation comprises Bluetooth signals, and the first and second mobile devices include mobile telephones.

5. The method of claim 1, further comprising:
ranking, based on the contact information, the requested contacts based on a correlation between the reference contact and each of the requested contacts.

6. The method of claim 5, wherein the correlating includes:
comparing a profession, an interest, a calendar event, an updated time, a location, a physical address, a network address, a cell tower identifier, a wireless local area network identifier, a country code, an area code, or an age associated with the reference contact, a profession, an interest, a calendar event, a search time, a location, a physical address, a network address, a cell tower identifier, a wireless local area network identifier, a country code, an area code, or an age, respectively, associated with one or more of the requested contacts.

7. The method of claim 1, wherein the one or more contacts identified in the contact information for the subset of the database of contacts are linked to the reference contact based on a placed or received call, a sent or received text message, a sent or received multi-media message, calendar event information, history of a shared file, photograph meta data, or a recognized face in a photograph, with respect to the first mobile device.

8. A method performed by a server device, the method comprising:
receiving, by the server device from a first device, a request for contacts linked, via one or more contact links, to a reference contact, identified in contact information stored in a database of a plurality of contacts, wherein the reference contact corresponds to the first device;
searching, by a processor of the server device, contact information for the requested contacts to identify the one or more contact links linking each of the requested contacts to the reference contact, wherein the contact information for the reference contact does not include a forward contact link to any of the requested contacts;
determining, by a processor of the server device, whether respective mobile devices associated with different ones of the requested contacts are within a vicinity of the first device;
ranking, by a processor of the server device, the requested contacts based on the determination of whether the respective devices are within the vicinity; and
ranking, by a processor of the server device, the requested contacts based on a correlation between the reference contact and different ones of the requested contacts, wherein the correlation is based on at least one of a calendar event, a search time, an update time, or a country code, associated with the reference contact, and at least one of a calendar event, a search time, an update time, or a country code, respectively, associated with the different ones of the requested contacts.

9. A device comprising:
a receiver to receive a request from a first mobile device corresponding to a reference contact in a database of contacts, for contacts in the database of contacts linked, via one or more other contacts, one or more contacts, associated with the reference contact, identified in contact information for a subset of the database of contacts; and
a processor to:
search the database for contact information for the one or more other contacts in the database of contacts to identify a type and a number of contact links linking each of the requested contacts to the one or more contacts identified in the contact information for the subset of the database of contacts,
determine a database distance between a reference contact and each of one or more the requested contacts, based on the type and the number of the contact links linking each of the requested contacts to the one or more contacts identified in the contact information for the subset of the database of contacts,
determine a proximity of respective mobile devices, identified in contact information associated with different ones of the requested contacts, relative to the first mobile device,
rank the search results based on:
the determined database distances, and
the determined proximities; and
provide the ranked requested contacts and at least a phone number identified in the contact information associated with each of the respective mobile devices, to the first mobile device.

10. The device of claim 9, wherein the first and second mobile devices include mobile telephones.

11. The device of claim 9, wherein the subset of the database of contacts is linked to the reference contact based on a placed or received call, a sent or received text message, a sent or received multi-media message, calendar event information, history of a shared file, photograph meta data, or a recognized face in a photograph, with respect to the first mobile device.

12. The device of claim 9, where the processor is further configured to rank the requested contacts based on a correlation between the reference contact and each of the requested contacts.

13. A device comprising:
means for receiving a request from a first mobile device corresponding to a reference contact in a contact database, for contacts in the contact database linked, via one or more other contacts in the contact database, to one or more contacts, associated with the reference contact, identified in contact information for a subset of contacts in the contact database;
means for searching contact information for the one or more other contacts in the contact database to identify a type and a number of contact links linking each of the requested contacts to the one or more contacts identified in the contact information for the subset of contacts;
means for determining a database distance between the reference contact and each of the requested contacts, based on the type and the number of the contact links linking each of the requested contacts to the one or more contacts identified in the contact information for the subset of contacts;
means for determining whether a proximity of respective mobile devices, identified in contact information associated with different ones of the requested contacts, relative to the first mobile device;

means for ranking the requested contacts based on the determined database distances;

means for ranking the requested contacts based on a correlation between the reference contact and each of the requested contacts;

means for ranking the requested contacts based on the determined proximities; and means for providing, based on the ranking, the ranked contacts and at least a phone number identified in the contact information associated with each of the respective mobile devices, to the first mobile device.

14. The device of claim 13, wherein the contact database is stored in a server separate from the first mobile device and the respective mobile devices.

* * * * *